Molding apparatus, Die expressing.

No. 652,965. Patented July 3, 1900.
H. H. HUNGERFORD.
CAKE MACHINE.
(Application filed Sept. 26, 1898.)
(No Model.)

*No working of dough during forcing*

*Cam groove*

*Removable for cleaning*

Witnesses,

Inventor,
Henry H. Hungerford,

UNITED STATES PATENT OFFICE.

HENRY H. HUNGERFORD, OF CHICAGO, ILLINOIS, ASSIGNOR TO FRANK M. PETERS, OF SAME PLACE.

CAKE-MACHINE.

SPECIFICATION forming part of Letters Patent No. 652,965, dated July 3, 1900.

Application filed September 26, 1898. Serial No. 691,873. (No model.)

*To all whom it may concern:*

Be it known that I, HENRY H. HUNGERFORD, of Chicago, in the county of Cook and State of Illinois, have invented certain new and useful Improvements in Cake-Machines, of which the following is a specification.

This invention relates to cake-machines, and more particularly to a feeding mechanism whereby the dough is fed from a hopper or reservoir to and through one or more nozzles or dies, whereby it is given the desired shape and size in cross-section to adapt it to be subdivided into cakes, biscuits, or the like.

The object of my invention is to provide a mechanism whereby the dough will be fed forward positively and smoothly without clogging and without working the dough, which should be in proper condition when placed in the reservoir or hopper and which should not be subjected to any further working or kneading to an appreciable extent in its passage to and through the dies.

To these ends my invention consists in certain novel features which I will now proceed to describe and will then particularly point out in the claim.

Figure 1:
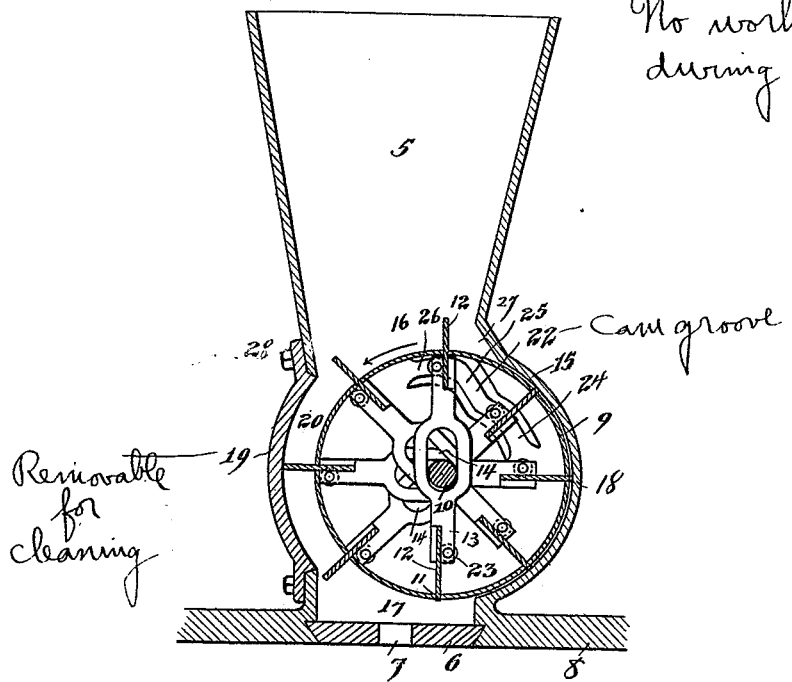
Figure 2:
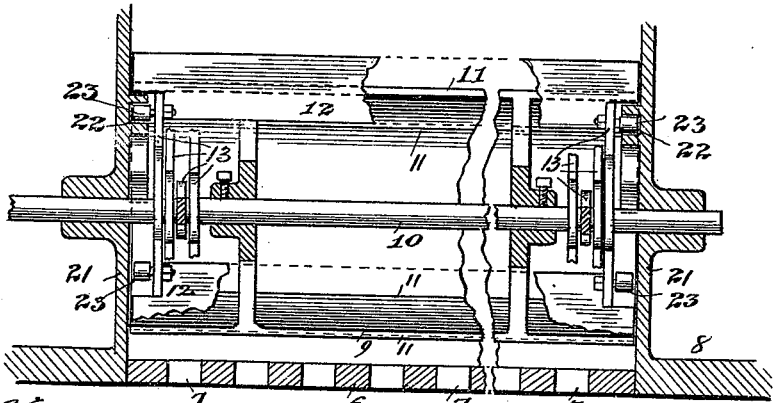

In the accompanying drawings, Figure 1 is a transverse sectional view of a mechanism embodying my invention; and Fig. 2, a longitudinal sectional view of the same, partially broken away.

In the said drawings, 5 represents a hopper or reservoir in which the dough is placed after being properly worked, and 6 indicates the die-plate, having one or more openings 7, through which the dough is to be forced in order to give it the proper shape in cross-section, said die-plate being mounted in a bed-plate 8, which supports the die-plate, hopper, and feeding mechanism.

9 indicates the feeding-cylinder, which is mounted upon a shaft 10, to which rotary motion is imparted in any suitable manner to cause the cylinder 9 to rotate in the direction of the arrow in Fig. 1. The cylinder 9 is hollow or recessed at its ends and preferably throughout its length, as indicated in Fig. 2, and is provided with a plurality of radial slots 11, in which are mounted and radially movable a corresponding number of blades or paddles 12, which extend longitudinally of the cylinder and are radially movable with relation thereto. I prefer to connect these blades or paddles in the manner indicated more particularly in Fig. 1, the two blades which lie diametrically opposite each other being connected by transverse arms 13, mounted in the recesses at each end of the cylinder 9 and provided with slots 14 for the passage of the shaft 10. The cylinder 9 is mounted in a casing 15, which lies between the hopper and die-plate, and has an upper opening 16, communicating with the hopper, and a lower opening 17, communicating with the apertures of the die-plate. One of the side walls of this casing lies closely against the cylinder 9, as indicated at 18, its curvature having the axis of rotation of the shaft 10 as a center. The other side wall 19 of this casing also has a curvature the center of which is the axis of rotation of the shaft 10, so that the two side walls have a common center or axis. The radius, however, of curvature of the side wall 19 is greater than that of the side wall 18, so that there exists a considerable space or passage 20 between the cylinder and the wall 19, which space or passage is of equal width at all points.

The end walls 21 of the casing 15 are each provided with a cam-groove 22, and each arm 13 is provided with a projection or roller 23 at each end to engage said cam-grooves. Said grooves extend for about one-quarter of the circumference of the cylinder and comprise a portion 24 of smaller radius, an intermediate inclined portion 25, and a portion 26 of greater radius. The relative lengths of the radii of the portions 24 and 26 are such that when one of the projections or rollers 23 is traveling within the portion 24 the blade at that end of the arm 13 is retracted within the cylinder, so as to lie about flush with the surface thereof and with the inner surface of the wall 18, while the blade at the other end of said arm is projected from the cylinder to an extent equal to the width of the space or passage 20. When said roller 23 passes along the incline 25, the retracted blade will be gradually projected outward from the cylinder, the casing being beveled or cut away, as indicated at 27, to permit this projection, and when said roller has entered and passes through the portion 26 of greater diameter the blade at that end of the arm is projected to the limit of its outward movement—i. e., to an extent equal to the width of the space or passage 20. The projecting of this blade effects a corresponding withdrawal of the companion blade at the other end of the arm into the cylinder.

The apparatus thus constructed operates in the following manner: The hopper or reservoir 5 having been filled with dough, rotary movement is imparted to the cylinder 9. As each successive blade passes clear of the portion 18 of the casing it is projected upward, so that its front face engages with the dough in the lower portion of the hopper and carries the same forward and downward through the space 20 into the delivery-opening 17, where it is forced through the die-openings 7 of the die-plates 6. Each blade as it approaches its lowest position is retracted into the cylinder by the action of the cam-grooves on the rollers at the other end of the arms 13, while the opposite blade is at the same time projected in order to engage and carry forward another portion of the dough in the hopper. The withdrawal of each blade occurs before said blade comes opposite the inner surface of the portion 18 of the casing, and the blades are always positively held in their proper projected or withdrawn positions either by means of the cam-grooves 22 or by the abutting of the edges of the blades against the inner surfaces of the walls 18 and 19 of the casing. It will be noted that the distance between the inner surfaces of these walls is substantially equal to the distance from the edge of one blade to that of its companion blade diametrically opposite to it and on the other end of the same arm, so that during the time when any given arm is not in engagement with the cam-groove its position is positively determined by the walls of the casing. These walls being concentric, although of different radius, there is no variation in the distance between the blades and the walls, and clogging of the dough either in the passage 20 or between the cylinder and the wall 18 is prevented. Moreover, the dough cannot adhere to the blades, as it is stripped from each blade as it is withdrawn into the cylinder. There is, moreover, no working of the dough, such as occurs where this latter is fed between ribbed or corrugated rollers or by means of a screw-feed, and the dough is therefore delivered from the dies in proper condition.

It will be understood, of course, that after the dough has been protruded through the apertures 7 it is cut off at intervals by means of suitable cutting mechanism such as is well known and commonly employed for this purpose in machines of this description.

I have shown the side wall 19 of the casing as removable for the purpose of giving access to the interior of the casing for inspection, cleaning, or repair, it being secured by screw-bolts 28 or in any other suitable manner for this purpose.

It is obvious that the details of construction hereinbefore set forth may be modified without departing from the principle of my invention. For instance, I have shown the cylinder as provided with eight blades or paddles; but the number of these elements may obviously be varied as desired, according to the requirements of the machine and the nature of the material operated upon. I therefore do not wish to be understood as limiting myself to the precise details of construction hereinbefore described, and shown in the drawings.

I claim—

In a cake-machine, the combination, with a suitable casing, of a slotted feed-cylinder therein, radially-movable blades or paddles mounted in said slots, transverse arms connecting said blades in diametrically-opposite pairs, said arms being provided with slots for the passage of the axis of the cylinder and with projections at their ends, and the casing being provided with cam-grooves in its end walls with which said projections engage, substantially as described.

HENRY H. HUNGERFORD.

Witnesses:
FREDERICK C. GOODWIN,
L. T. MANN.